US012612874B2

(12) United States Patent
Darkins, Jr. et al.

(10) Patent No.: US 12,612,874 B2
(45) Date of Patent: Apr. 28, 2026

(54) POWER SYSTEM HAVING A GAS TURBINE ENGINE

(71) Applicant: General Electric Company, Schenectady, NY (US)

(72) Inventors: Toby G. Darkins, Jr., Loveland, OH (US); Megan Virginia Stieg, Orlando, FL (US); Miroslaw Pawel Babiuch, Cincinnati, OH (US); Jocelyn E. Passty, Huntersville, NC (US); Allen M. Danis, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/415,895

(22) Filed: Jan. 18, 2024

(65) Prior Publication Data

US 2025/0237170 A1    Jul. 24, 2025

(51) Int. Cl.
| | |
|---|---|
| *F02C 3/34* | (2006.01) |
| *F01K 23/10* | (2006.01) |
| *F02C 1/08* | (2006.01) |
| *F02C 3/30* | (2006.01) |
| *F02C 6/08* | (2006.01) |

(52) U.S. Cl.
CPC ............... *F02C 6/08* (2013.01); *F01K 23/10* (2013.01); *F02C 1/08* (2013.01); *F02C 3/30* (2013.01); *F02C 3/34* (2013.01)

(58) Field of Classification Search
CPC .................................... F02C 3/34; F02C 6/08
See application file for complete search history.

(56) References Cited

U.S. PATENT DOCUMENTS 3,753,544 A * 8/1973 Hodgkins ............ B01D 29/012
                                                       249/141
4,012,194 A * 3/1977 Maffei ............... B01D 11/0203
                                                       8/142

(Continued)

FOREIGN PATENT DOCUMENTS

WO        200564232 A1    7/2005

OTHER PUBLICATIONS

Best et al., "Exhaust Gas Recirculation and Selective Exhaust Gas Recirculation on a Micro-Gas Turbine for Enhanced CO2 Capture Performance," The Future of Gas Turbine Technology, 8th International Gas Turbine Conference, Brussels, Belgium, 2016, p. 1-10.

*Primary Examiner* — Devon C Kramer
*Assistant Examiner* — Marc Amar
(74) *Attorney, Agent, or Firm* — McCarter & English, LLP

(57) ABSTRACT

A power system includes a gas turbine engine including, in serial flow relationship defining a flow passage, a compressor section, a combustion section, a turbine section, and an exhaust section, the gas turbine engine generating exhaust gas that includes a baseline amount of carbon dioxide by volume within the exhaust gas. A carbon capture unit is arranged downstream of the gas turbine engine and processes the exhaust gas output by the gas turbine engine to capture the carbon dioxide contained in the output exhaust gas. A carbon dioxide reinjection system is arranged to reinject at least a portion the carbon dioxide captured from the output exhaust gas by the carbon capture unit into the flow passage of the gas turbine engine.

14 Claims, 10 Drawing Sheets

(56) References Cited

U.S. PATENT DOCUMENTS

| | | | | |
|---|---|---|---|---|
| 4,155,680 A * | 5/1979 | Linko, III | F02C 7/25 | |
| | | | 415/121.2 | |
| 4,155,681 A * | 5/1979 | Linko, III | F02C 6/08 | |
| | | | 415/121.2 | |
| 4,344,282 A * | 8/1982 | Anders | F02C 9/18 | |
| | | | 60/785 | |
| 4,348,422 A * | 9/1982 | Zosel | A23F 5/226 | |
| | | | 426/427 | |
| 5,160,241 A * | 11/1992 | Glynn | F04D 29/584 | |
| | | | 415/144 | |
| 5,331,806 A * | 7/1994 | Warkentin | F02C 3/305 | |
| | | | 60/39.52 | |
| 5,673,554 A * | 10/1997 | DeFreitas | F02P 23/045 | |
| | | | 60/776 | |
| 6,269,624 B1 * | 8/2001 | Frutschi | F02C 1/06 | |
| | | | 60/39.52 | |
| 6,957,539 B2 | 10/2005 | Lebas et al. | | |
| 8,104,259 B2 | 1/2012 | Joshi et al. | | |
| 8,850,789 B2 | 10/2014 | Evulet et al. | | |
| 11,047,306 B1 | 6/2021 | Millhaem et al. | | |
| 11,624,317 B2 | 4/2023 | Holley et al. | | |
| 2001/0000049 A1 * | 3/2001 | Kataoka | F02C 3/34 | |
| | | | 60/775 | |
| 2002/0023423 A1 * | 2/2002 | Viteri | F02C 6/18 | |
| | | | 60/39.182 | |
| 2006/0112696 A1 * | 6/2006 | Lynghjem | F02C 3/34 | |
| | | | 60/39.181 | |
| 2010/0247292 A1 * | 9/2010 | Davis, Jr. | F02C 1/08 | |
| | | | 415/144 | |
| 2010/0319354 A1 * | 12/2010 | Guidati | F02C 3/34 | |
| | | | 60/39.182 | |
| 2011/0083444 A1 * | 4/2011 | Bathina | F02C 7/22 | |
| | | | 60/776 | |
| 2011/0200491 A1 * | 8/2011 | Wijmans | B01D 53/225 | |
| | | | 422/169 | |
| 2012/0131897 A1 * | 5/2012 | Gonzalez | F04F 5/54 | |
| | | | 60/39.5 | |
| 2012/0144837 A1 * | 6/2012 | Rasmussen | F25J 3/04533 | |
| | | | 60/39.19 | |
| 2012/0240590 A1 * | 9/2012 | Hellat | F02C 3/30 | |
| | | | 416/223 R | |
| 2013/0028707 A1 * | 1/2013 | Puerta | F02C 7/1435 | |
| | | | 415/1 | |
| 2013/0058760 A1 * | 3/2013 | Puerta | F02C 9/18 | |
| | | | 29/428 | |
| 2013/0145773 A1 * | 6/2013 | Kulkarni | F02C 3/34 | |
| | | | 60/39.5 | |
| 2016/0134291 A1 * | 5/2016 | Fetvedt | F02C 9/24 | |
| | | | 700/282 | |
| 2016/0299047 A1 * | 10/2016 | Molla | B01L 3/502784 | |
| 2017/0058696 A1 * | 3/2017 | Manteiga | F01D 25/24 | |
| 2018/0016933 A1 | 1/2018 | Elbibary et al. | | |
| 2021/0285371 A1 * | 9/2021 | Jaerling | F23R 3/26 | |
| 2022/0220903 A1 * | 7/2022 | Johansson | F02C 9/18 | |
| 2022/0235707 A1 * | 7/2022 | Millhaem | F02C 6/08 | |
| 2022/0251968 A1 * | 8/2022 | Taylor | F01D 25/246 | |
| 2022/0282668 A1 | 9/2022 | Huntington et al. | | |
| 2023/0212989 A1 * | 7/2023 | Malkus | F02C 6/08 | |
| | | | 415/36 | |
| 2023/0220799 A1 * | 7/2023 | Shinde | F02C 7/32 | |
| | | | 60/226.1 | |
| 2024/0003270 A1 * | 1/2024 | Smith | F02C 3/34 | |

* cited by examiner

POWER SYSTEM HAVING A GAS TURBINE ENGINE

TECHNICAL FIELD

The present disclosure relates to a power system having a gas turbine engine.

BACKGROUND

Conventionally, a power system (e.g., a land-based or a marine-based power plant) may include a gas turbine engine that is utilized to drive elements such as a generator to produce electricity, or to drive a mechanical drive shaft so as to function as a prime mover (e.g., a power source to drive an industrial gas compressor or to drive a marine propulsion gearbox). The gas turbine engine generates exhaust gas that includes carbon dioxide. To meet emissions requirements, the power system may also include a carbon capture unit that processes the exhaust gas to capture the carbon dioxide from the exhaust gas and then to store the captured carbon dioxide.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
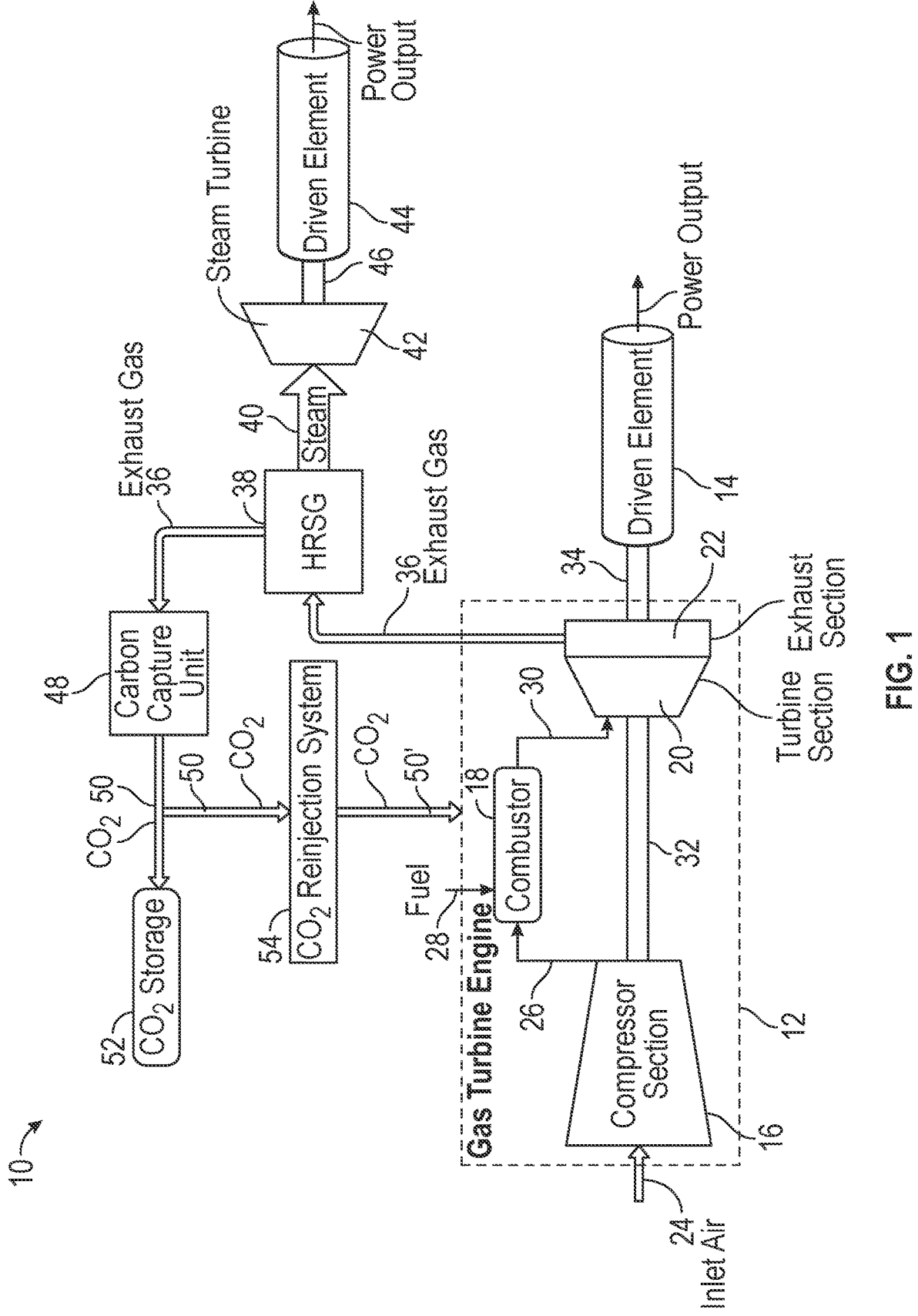
FIG. 1 is a schematic diagram depicting an exemplary power system, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A power system, such as an electricity generating power plant or a prime mover providing driving power to drive a mechanical drive shaft to drive an element (e.g., to drive an industrial gas compressor or to drive a marine propulsion gearbox), may include a gas turbine engine. The gas turbine engine is utilized to drive either a generator to produce electricity or to drive the mechanical drive shaft as a prime mover. The gas turbine engine generates exhaust gas that includes various emissions products, including carbon dioxide. To meet emissions requirements, the power plant may also include a carbon capture unit that processes the exhaust gas from the gas turbine engine to capture the carbon dioxide from the exhaust gas, and then to store the captured carbon dioxide. Generally, the carbon capture unit is a large unit that, in a land-based power plant, which may require a large footprint of land. In such a land-based system, the weight and the size of the carbon capture unit is generally not a concern. Thus, while a large carbon capture unit may be acceptable for land-based power systems, the large size, and correspondingly, a heavy weight, of the carbon capture unit is less desirable, and mostly likely infeasible, for marine-based and off-shore power plant or prime mover applications. For example, an off-shore oil drilling platform that may be stationed off shore over open water may also utilize a power generating system and/or a prime mover with a gas turbine engine and a carbon capture unit. With a marine-based power generating and/or prime mover gas turbine system, the large size and weight of the carbon capture unit is undesirable, and it may become necessary to limit the size of the carbon capture unit, thereby also limiting the amount of carbon dioxide that can be captured from the exhaust gas.

The present disclosure addresses the foregoing by providing a power system in which carbon dioxide captured by the carbon capture unit is reinjected into the gas turbine engine so as to increase the efficiency of the carbon capture unit, thereby providing the ability to reduce the size and the weight of the carbon capture unit. In particular, the present disclosure provides a power system that includes a gas turbine engine that generates exhaust gas that includes a baseline amount of carbon dioxide by volume within the exhaust gas, and a carbon capture unit arranged downstream of the gas turbine engine that processes the exhaust gas generated by the gas turbine engine to capture at least a portion of the baseline amount of the carbon dioxide contained in the exhaust gas. A carbon dioxide reinjection system is arranged to reinject at least a portion the carbon dioxide captured from the exhaust gas by the carbon capture unit into a flow passage of the gas turbine engine. Injecting the carbon dioxide into the flow passage of the gas turbine engine may constitute any of injecting the carbon dioxide into an inlet of a compressor of the gas turbine engine, injecting the carbon dioxide into a compressor reverse bleed passage of the near a compressor discharge pressure bleed passage, or injecting the carbon dioxide into a combustor of the gas turbine engine. By reinjecting a portion of the captured carbon dioxide, the total amount of carbon dioxide in the exhaust gas can be increased above the baseline amount, and the carbon capture unit can be made more efficient to capture the higher percentage of the carbon dioxide, providing the ability to reduce the size and the weight of the carbon capture unit.

Referring now to the drawings, FIG. 1 is a schematic diagram depicting an exemplary power system 10, according to an aspect of the present disclosure. As shown in FIG. 1, the power system 10 includes a gas turbine engine 12 that is connected with a driven element 14 via a shaft 34 to drive the driven element 14. In one aspect, the driven element 14 may be a generator that is driven to generate electricity that can be output to, for example, a land-based electrical grid, or to generate electricity on a floating production storage and offloading (FPSO) vessel. In other aspects, the driven element 14 may be, for example, a mechanical system (e.g., a propulsion or powertrain system for driving a locomotive or for driving a marine vessel, or an oil drilling/pumping drive mechanism) that is driven by the gas turbine engine 12. The gas turbine engine 12 will be described in more detail below, but, briefly, the gas turbine engine 12 includes, in a serial flow relationship, a compressor section 16, a combustion section (or combustor) 18, a turbine section 20, and an exhaust section 22. The compressor section 16 takes in inlet air 24, and a series of compressor rotors (described below) within the compressor section 16 compresses the inlet air 24 to generate compressed air 26 that is provided to the combustor 18. The combustor 18 receives the compressed air 26 from the compressor section 16 and receives fuel 28 (e.g., natural gas or liquid diesel) to mix with the compressed air 26 in the combustor 18. The mixed fuel 28 and compressed air 26 are then ignited and burned within the combustor 18 to generate combustion products 30. The combustion products 30 are then provided to the turbine section 20, where work is extracted from the combustion products 30 to cause turbine rotors (described below) within the turbine section 20 to rotate. The turbine section 20 is connected with the compressor section 16 via a shaft 32 such that the rotation of the turbine rotors within the turbine section 20 support rotation of the compressor rotors within the compressor section 16. The turbine section 20 may also be connected with the driven element 14 via the shaft 34 so as to drive the driven element 14 to generate the electricity or to provide the mechanical shaft power. The remaining combustion products 30 are then exhausted through the exhaust section 22 as exhaust gas 36.

In the gas turbine engine 12, by generating the combustion products 30 utilizing the fuel 28 and the compressed air 26, the exhaust gas 36 may include, as a baseline amount (described below) of carbon dioxide, nominally between two percent and five percent, or about (e.g., plus or minus a threshold amount) 3.4 percent of carbon dioxide by volume. Here, the baseline amount refers to the gas turbine engine 12 operating under normal conditions without any carbon dioxide recirculation (to be described below) back into the gas turbine engine 12, and by merely taking in the inlet air 24 at standard temperature and pressure. Generally, the inlet air 24 includes about 0.03 percent carbon dioxide by volume, and generating the combustion products 30 results in the exhaust gas 36 containing about 3.4 percent carbon dioxide by volume as the baseline amount of carbon dioxide. While 3.4 percent will be utilized herein as the baseline amount, as stated above, the baseline amount of carbon dioxide may be nominally between about two percent (2%) and about five percent (5%) by volume, although other amounts may also be generated instead.

In FIG. 1, a heat recovery steam generator (HRSG) 38 may be arranged downstream of the gas turbine engine 12, and the exhaust section 22 is arranged in fluid communication with the HRSG 38. While not shown in FIG. 1, the HSRG may include a boiler filled with water, and the exhaust gas 36 may be utilized by the HRSG 38 to heat the water in the boiler so as to generate steam 40. The steam 40 may then be provided to a steam turbine 42 so as to cause the steam turbine 42 to rotate. The steam turbine 42 is connected with a driven element 44 via a shaft 46 so that the rotation of the steam turbine 42 causes the driven element 44 to rotate. The driven element 44 may be similar to the driven element 14 in that the driven element 44 may be, for example, a generator to generate electricity or a mechanical system to provide mechanical shaft power.

The power system 10 further includes a carbon capture unit 48 arranged downstream of the HRSG 38, and the exhaust gas 36 flowing through the HRSG 38 is provided to the carbon capture unit 48. In one exemplary aspect, the carbon capture unit 48 may be a monoethanolamine (MEA)-based post-combustion capture process system. As described above, the exhaust gas 36 generated by the gas turbine engine 12 may include, as a baseline amount, about 3.4 percent carbon dioxide by volume. The carbon capture unit 48 will be described in more detail below, but briefly, one object of the carbon capture unit 48 is to process the exhaust gas 36 to extract the carbon dioxide within the exhaust gas 36, and to process the extracted carbon dioxide to output carbon dioxide 50 to a carbon dioxide storage tank 52 to store the carbon dioxide 50. As will be described in more detail below, the power system 10 further includes a carbon dioxide reinjection system 54 that is arranged to reinject at least a portion of the carbon dioxide 50 as carbon dioxide 50' back into the gas turbine engine 12 so as to increase the amount of carbon dioxide contained within the exhaust gas 36 above the baseline amount.

Figure 2:
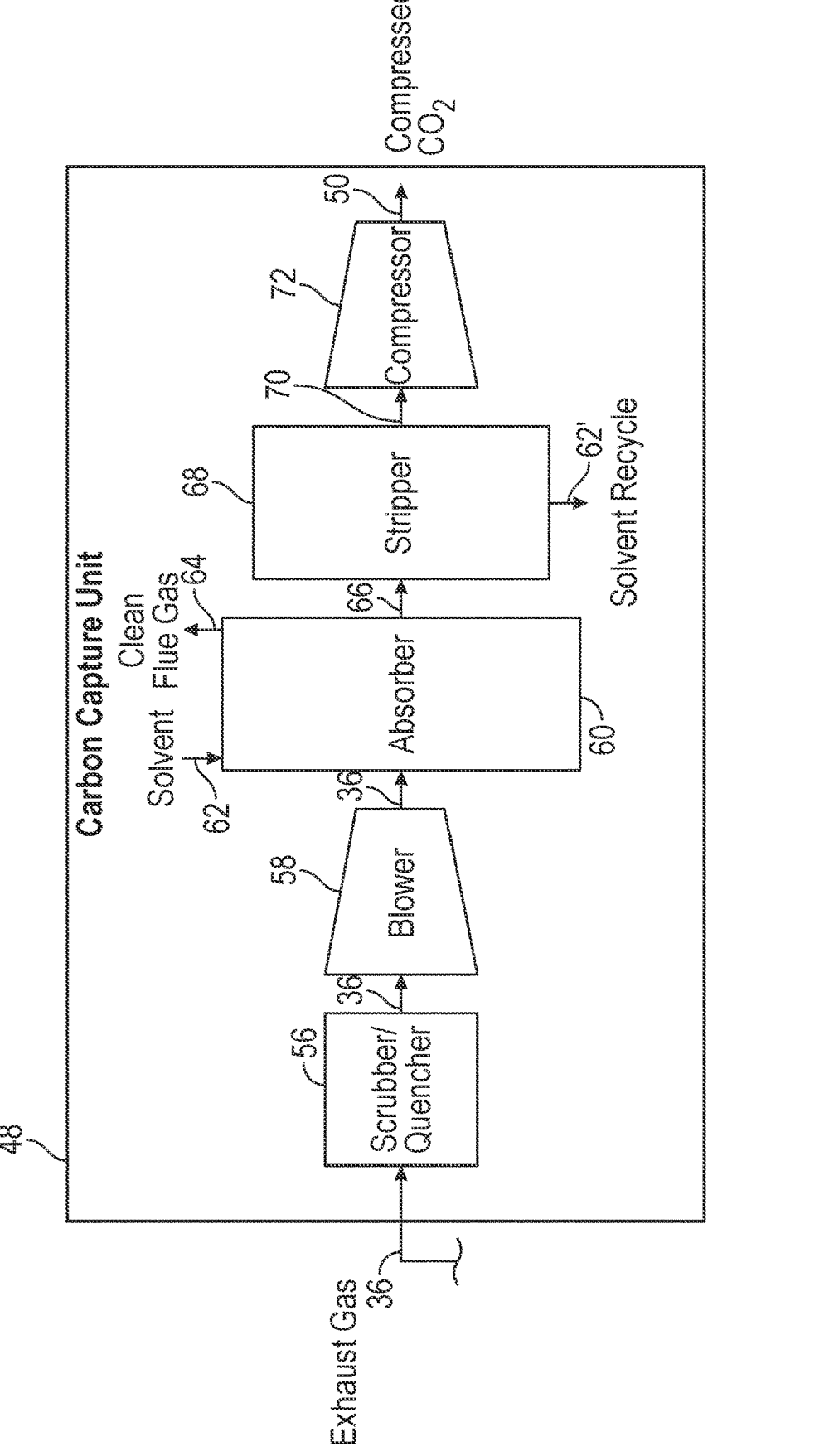
FIG. 2 is a schematic diagram of an exemplary carbon capture unit, according to an aspect of the present disclosure.

FIG. 2 depicts a schematic diagram of an exemplary carbon capture unit 48, according to an aspect of the present disclosure. As described above, the carbon capture unit 48 may be a monoethanolamine (MEA)-based post-combustion capture process system. In FIG. 2, the carbon capture unit 48 may include a scrubber/quencher 56 to desulphurize the exhaust gas 36. The scrubber/quencher 56 is optional and may be more readily conducive for implementation in a power system that utilizes a coal fired system rather than a natural gas burning gas turbine engine such as the gas turbine engine 12 of the present disclosure. A blower 58 provides a boost to the flow of the exhaust gas 36 through the carbon capture unit 48 and provides the exhaust gas 36 to an absorber 60. The absorber 60 may utilize a solvent 62 stored in a solvent storage tank (not shown) to process the exhaust gas 36 to obtain a clean gas flue gas 64 that may be exhausted out of the carbon capture unit 48 into the atmosphere, and to obtain carbon dioxide rich solvent 66. The carbon dioxide rich solvent 66 is provided to a stripper 68 to strip the solvent from the carbon dioxide rich solvent 66 and to provide recycled solvent 62' back to a solvent storage tank (not shown). The carbon dioxide 70 having been stripped of the solvent is then provided to one or more compressors 72 to compress the carbon dioxide 70 and to output the compressed carbon dioxide 50.

Figure 3:
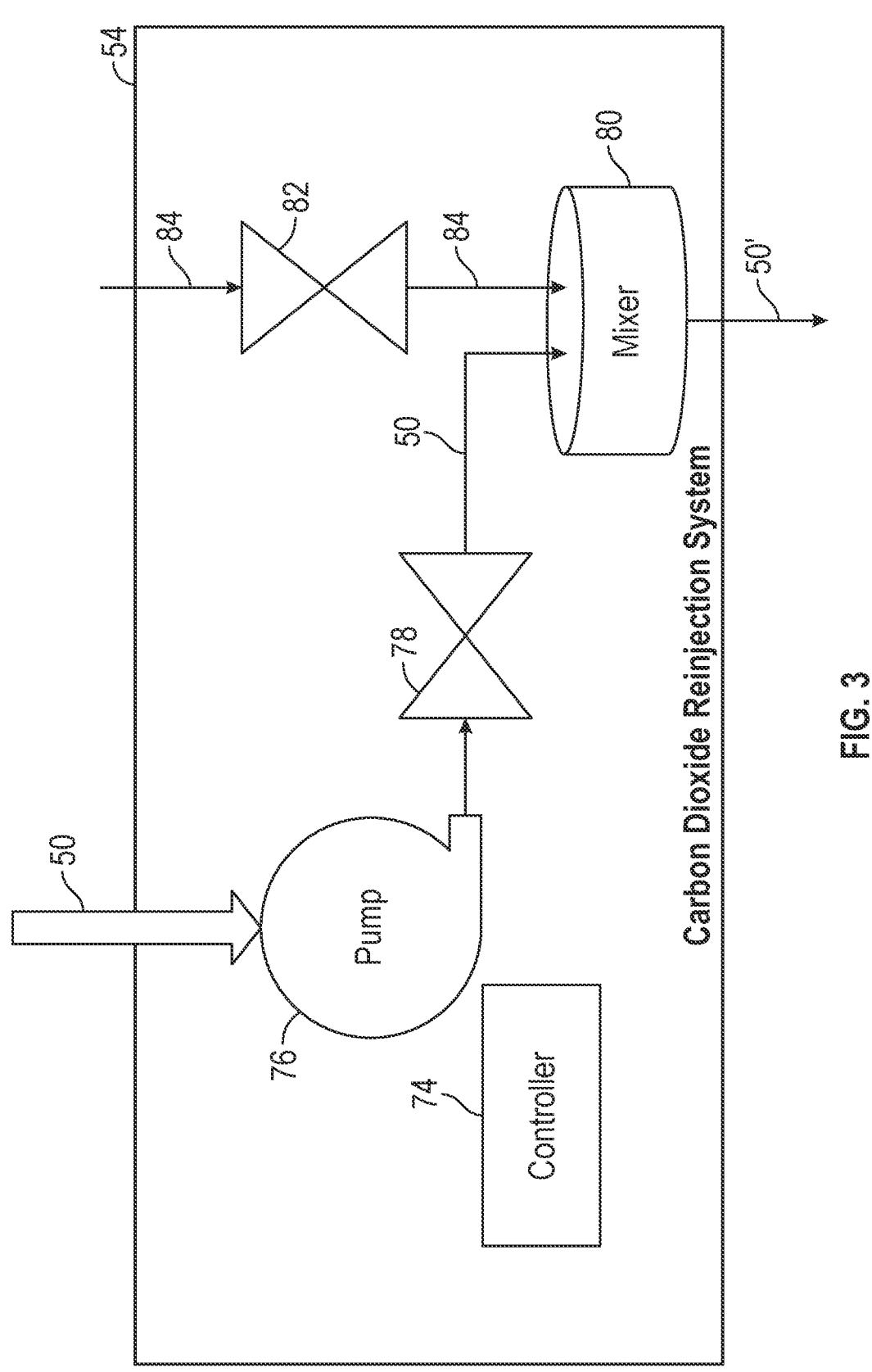
FIG. 3 is a schematic diagram of an exemplary carbon dioxide reinjection system, according to an aspect of the present disclosure.

FIG. 3 is a schematic partial cross-sectional view of an exemplary carbon dioxide reinjection system 54, according to an aspect of the present disclosure. Generally, the carbon dioxide reinjection system 54 includes a controller 74 to control the concentration and the flow of the captured carbon dioxide 50 that is reinjected into the gas turbine engine 12. The carbon dioxide reinjection system 54 may include a pump 76 and a valve 78 that are controlled by the controller 74 to assist in providing the flow of the captured carbon dioxide 50 exiting from the carbon capture unit 48 to the carbon dioxide reinjection system 54, and to assist in providing the flow of the carbon dioxide 50' to be reinjected into the gas turbine engine 12. The carbon dioxide reinjection system 54 may also include a mixer 80 that is in fluid communication with the valve 78 and that receives the captured carbon dioxide 50 provided to the carbon dioxide reinjection system 54. The mixer 80 may also be in fluid communication with a valve 82 that can provide a flow of air 84 (or any other mixing gas) to the mixer 80, where the valve 82 is also controlled by the controller 74. The mixer 80, which is controlled by the controller 74, is arranged to monitor and to meter a concentration of the captured carbon dioxide 50, based on known conditions, that flows therethrough and that is to be provided to the gas turbine engine 12. Thus, the mixer 80, under the control of the controller 74, can adjust the concentration of the carbon dioxide by mixing the air 84 (or other gases) with the carbon dioxide 50, if necessary, so as to control the concentration and the flow of the carbon dioxide 50' to the gas turbine engine 12. Here, the controller 74 may also be in communication with another controller (not shown) of the carbon capture unit 48 so as to adjust the concentration of the carbon dioxide 50' being reinjected back into the gas turbine engine 12 so as to obtain a desired amount of carbon dioxide concentration within the exhaust gas 36 being processed by the carbon capture unit 48.

Figure 4:
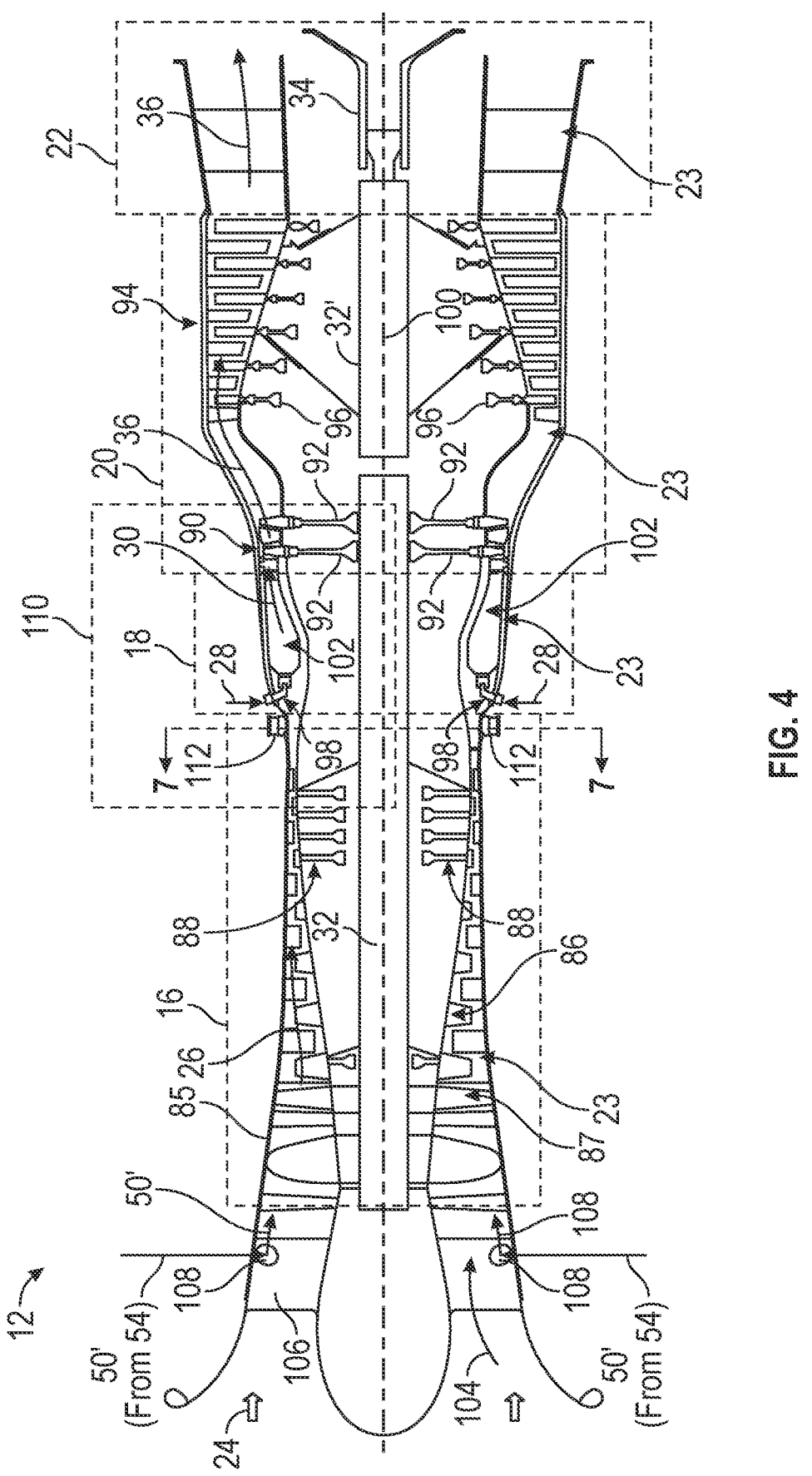
FIG. 4 is a schematic partial cross-sectional view of an exemplary gas turbine engine, according to an aspect of the present disclosure.

FIG. 4 is a schematic partial cross-sectional view of an exemplary gas turbine engine 12, according to an aspect of the present disclosure. As described above, the gas turbine engine 12 includes the compressor section 16, the combustor 18, the turbine section 20, and the exhaust section 22, each defined circumferentially about a longitudinal centerline axis 100. Each of the compressor section 16, the combustor 18, the turbine section 20, and the exhaust section 22 is contained within an outer casing 85, and together, the compressor section 16, the combustor 18, the turbine section 20, and the exhaust section 22 define a flow passage 23. The compressor section 16 includes a compressor inlet 104 at an upstream end of the compressor section 16 to provide a flow of inlet air 24 to flow into the compressor section 16. The compressor section 16 also includes a compressor rotor shaft assembly 86 within the outer casing 85 that includes a plurality of compressor rotors 88 connected to the shaft 32. Each of the compressor rotors 88 includes a plurality of rotor vanes that compress the inlet air 24 as the inlet air 24 passes through the compressor section 16 to generate the compressed air 26. A compressor flow path 87 is defined between the outer casing 85 and the compressor rotor shaft assembly 86, where the inlet air 24 enters the compressor section 16 and the compressed air 26 flows through the compressor flow path 87 toward the combustor 18. The compressor section 16 also includes a compressor discharge pressure (CDP) bleed structure 112 arranged at a downstream end of the compressor flow path 87. The CDP bleed structure 112 will be described in more detail below, but briefly, the CDP bleed structure 112 may provide for some of the compressed air 26 to bleed therethrough to be provided to various other areas of the gas turbine engine 12, or may provide the ability to reinject the carbon dioxide 50' back into the compressor flow path 87.

The combustor 18 receives the compressed air 26 via the compressor flow path 87. The combustor 18 includes a combustor liner (described below) and a dome structure (also described below) that define a combustion chamber 102. The combustor 18 includes a plurality of fuel nozzle assemblies 98 that are connected to the dome structure and that are circumferentially spaced apart about the longitudinal centerline axis 100. The combustor 18 may be any of a single annular combustor (SAC), a dry low emissions (DLE) combustor, a Twin Annular Premixing Swirler (TAPS) combustor, or any other type of combustor that may be implemented in gas turbine engines. Each of the fuel nozzle assemblies 98 receives a flow of the fuel 28 and a flow of the compressed air 26, and mix the fuel 28 and the compressed air 26 together to form a fuel/air mixture that is injected into the combustion chamber 102. In the combustion chamber 102, the fuel/air mixture is ignited and burned to generate the combustion products 30, that then flow into the turbine section 20 as the exhaust gas 36. Thus, the combustor 18 forms a part of the flow path through the gas turbine engine 12 by being in fluid communication with the compressor section 16 and the turbine section 20.

The turbine section 20 may include both a high pressure turbine 90 and a low pressure turbine 94. The high pressure turbine 90 includes a plurality of high pressure turbine rotors 92 that each includes a plurality of turbine rotor vanes connected thereto, and the high pressure turbine rotors 92 are also connected to the shaft 32. As was described above, the combustion products 30 flow into the turbine section 20 as the exhaust gas 36, and here, the exhaust gas 36 flows into the high pressure turbine 90, causing the high pressure turbine rotors 92 to rotate, thereby supporting operation of the compressor section 16 by causing the shaft 32 to rotate. The low pressure turbine 94 includes a plurality of low pressure turbine rotors 96 that each includes a plurality of turbine rotor vanes. The plurality of low pressure turbine rotors 96 are connected to a low pressure turbine shaft 32', which is also connected with the shaft 34 to drive the driven element 14 (FIG. 1). Thus, the exhaust gas 36 flowing through the low pressure turbine 94 causes the low pressure turbine rotors 96 to rotate, thereby supporting driving of the shaft 34. While not shown in FIG. 4, each of the shaft 32 and the low pressure turbine shaft 32' is supported by respective bearing and frame assemblies within the gas turbine engine 12. The exhaust gas 36 then flows through the exhaust section 22 and into the HRSG 38 as described above with regard to FIG. 1.

The reinjection of carbon dioxide from the carbon dioxide reinjection system 54 into the gas turbine engine 12 will now be described. Generally, the following description is provided for three different carbon dioxide reinjection techniques: reinjection to an inlet of the compressor section 16, reinjection to a reverse bleed passage of the compressor section 16, and reinjection into the combustor 18.

Referring still to FIG. 4, the compressor inlet 104 includes a plurality of circumferentially spaced apart inlet guide vanes 106 (two shown in FIG. 3). Each of the inlet guide vanes 106 may include a manifold 108 that is in fluid communication with the carbon dioxide reinjection system 54. The manifold 108 may include injection nozzles (not shown) such that the carbon dioxide 50' that is provided to the manifold 108 is injected via the nozzles into the compressor inlet 104. For the present aspect of injecting the carbon dioxide 50' into the compressor inlet 104, a desirable carbon dioxide concentration amount in the exhaust gas 36 to be processed by the carbon capture unit 48 may be about five percent (5%) by volume. Thus, with the baseline carbon dioxide concentration being 3.4 percent (3.4%) by volume generated by the gas turbine engine 12, a concentration of about 1.5 percent (1.5%) by volume for the carbon dioxide 50' is provided to the compressor inlet 104 by the carbon dioxide reinjection system 54, thereby obtaining the carbon dioxide concentration amount of about percent five (5%) by volume in the exhaust gas 36 to be processed by the carbon capture unit 48. The carbon capture unit 48 can therefore generate about 3.4 percent (3.4%) carbon dioxide by volume for storage in the carbon dioxide storage tank 52, while diverting 1.5 percent (1.5%) by volume of the captured carbon dioxide 50 to the carbon dioxide reinjection system 54 to reinject to the gas turbine engine 12.

Figure 5:
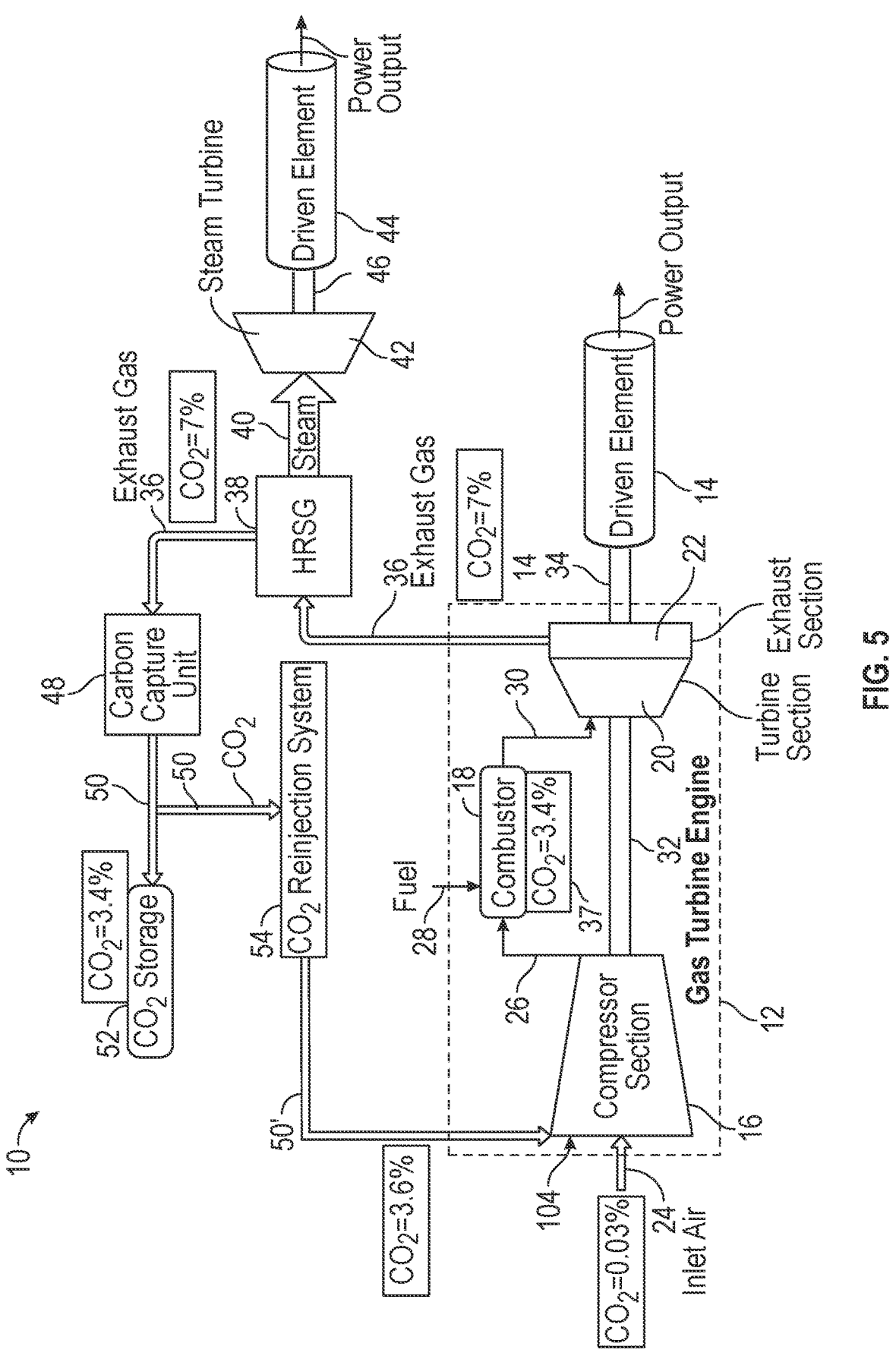
FIG. 5 is a schematic diagram similar to FIG. 1 depicting an exemplary power system and carbon dioxide amounts at various locations within the system, according to an aspect of the present disclosure.

FIG. 5 is a schematic diagram similar to FIG. 1 depicting an exemplary power system and carbon dioxide amounts at various locations within the system, according to an aspect of the present disclosure. In FIG. 5, carbon dioxide percentages throughout the power system 10 are depicted for the case when the carbon dioxide reinjection system 54 reinjects the carbon dioxide 50' into the compressor inlet 104 as shown in FIG. 4. In FIG. 5, elements that are the same as those of FIG. 1 include the same reference numerals and the description of those elements provided above for FIG. 1 applies equally for FIG. 5. As was described above, the inlet air 24 includes a carbon dioxide amount of about 0.03 percent (0.03%) carbon dioxide by volume, and the combustor 18 of the gas turbine engine 12 generates a baseline carbon dioxide amount of about 3.4 percent (3.4%) carbon dioxide by volume in the combustion products 30. FIG. 5 depicts percentages of carbon dioxide at various locations within the power system 10 after reaching a steady-state operating condition for the entire power system 10. That is, during an initial startup phase of the gas turbine engine 12 and the power system 10 in general, the carbon dioxide reinjection system 54 may not reinject carbon dioxide back into the gas turbine engine 12 until the initial startup phase has been completed (e.g., once the gas turbine engine 12 and the other systems within the power system 10 have reached a steady-state operating condition themselves). Thus, during the initial startup phase, the amount of carbon dioxide in the exhaust gas 36 may generally be about 3.4 (3.4%) percent by volume, which is a baseline amount 37 of carbon dioxide generated by the gas turbine engine 12 itself. Once the initial startup phase is completed, the carbon dioxide reinjection system 54 may then begin to reinject the carbon dioxide into the gas turbine engine 12 and the carbon dioxide reinjection system 54 reinjects the carbon dioxide so as to reach a desired steady-state amount of the carbon dioxide within the exhaust gas 36.

Alternatively, the carbon dioxide reinjection system 54 may begin reinjecting at least some of the baseline carbon dioxide generated by the gas turbine engine 12 during the initial startup phase back into the gas turbine engine 12 during the initial startup phase, and then continue to reinject the carbon dioxide into the gas turbine engine 12 so as to obtain the desired amount of the carbon dioxide concentration within the exhaust gas 36 to reach the steady state condition.

In the FIG. 5 aspect, the reinjection of the carbon dioxide 50' into the compressor inlet 104 (FIG. 4) is performed to reinject the carbon dioxide 50' into the compressor inlet 104 with a concentration of between two percent and eight percent, or, as shown in FIG. 5, generally about 3.6 percent (3.6%) by volume concentration. The reinjection of the carbon dioxide 50' at the compressor inlet 104 results in a carbon dioxide concentration within the exhaust gas 36 of between four percent (4%) and twelve percent (12%) by volume concentration, or, as shown in FIG. 5, generally about seven percent (7%) carbon dioxide concentration by volume in the case when 3.6 percent (3.6%) carbon dioxide concentration by volume is reinjected into the compressor inlet 104. The carbon capture unit 48 can capture the seven percent (7%) of the carbon dioxide by volume within the exhaust gas 36, compress and store about 3.4 percent (3.4%) by volume of the carbon dioxide 50 within the carbon dioxide storage tank 52, and provide the remaining 3.6 percent (3.6%) of the carbon dioxide 50 to the carbon dioxide reinjection system 54 to be reinjected back into the compressor inlet 104. One benefit of the $CO_2$ reinjection into the compressor inlet 104 is that it is possible to utilize existing anti-ice systems that are already developed for gas turbine engines for injecting anti-icing compressor air into the inlet, while also injecting the $CO_2$ into the inlet via the anti-icing system. The compressor inlet reinjection approach allows the $CO_2$ to be utilized in a wide range of heated or cooled states, depending on the ambient environment temperature. The 3.6 percent (3.6%) by volume amount of the $CO_2$ as described above is merely representative of one percentage of the $CO_2$ reinjection into the compressor inlet 104, and the amount of $CO_2$ that may be reinjected into the compressor inlet 104 may be set based on various conditions, including the amount of $CO_2$ that the compressor, and engine lubrication systems (e.g., oil sump hardware and lubrication) can handle without excessive deterioration in the systems. In addition, no additional parasite energy is required for an auxiliary $CO_2$ compressor to compress the carbon dioxide 50' at compressor inlet 104 conditions.

Figure 6:
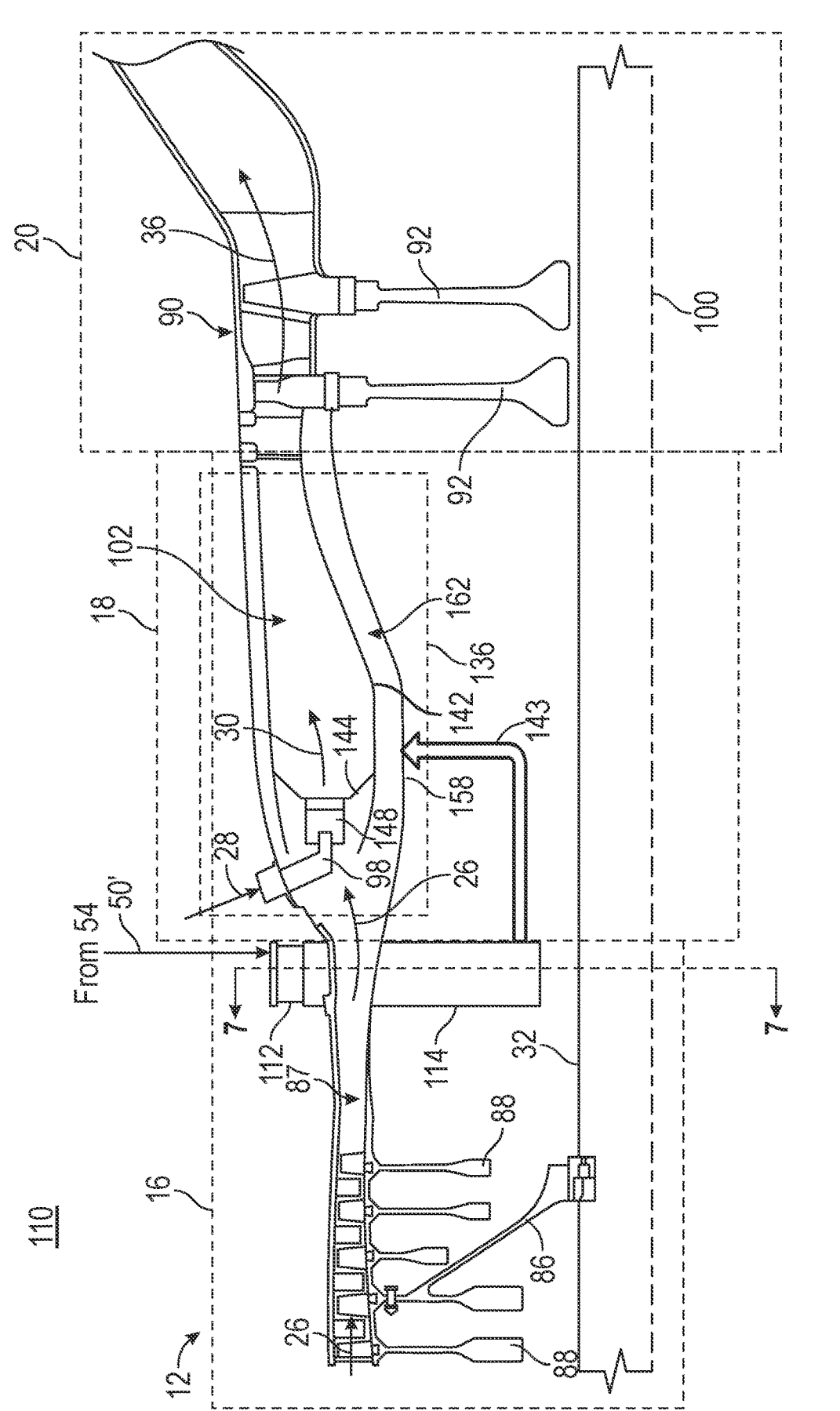
FIG. 6 is an enlarged partial cross-sectional view of a portion the gas turbine engine, taken at detail view 110 of FIG. 4, according to an aspect of the present disclosure.

FIG. 6 is an enlarged partial cross-sectional view of a portion of the gas turbine engine 12, taken at detail view 110 of FIG. 4, according to an aspect of the present disclosure. In the FIG. 6 aspect, the carbon dioxide reinjection system 54 is in fluid communication with a compressor discharge pressure (CDP) bleed structure 112 so as to reinject the carbon dioxide 50' into the CDP bleed structure 112 rather than reinjecting the carbon dioxide 50' into the compressor inlet 104. The CDP bleed structure 112 may be part of a compressor rear frame (CRF) structure 114, and is arranged at a downstream end of the compressor flow path 87. The CDP bleed structure 112 includes a compressor strut reinjection supply pathway 143 that provides fluid communication from the CDP bleed structure 112 to the combustor 18. The compressor strut reinjection supply pathway 143 is arranged to provide the flow of the carbon dioxide 50' through an inner casing 158 of the combustor 18 into an inner flow passage 162 between the inner casing 158 and an inner liner 142 of the combustor 18, and downstream of a dome structure 144 of the combustor 18. In this manner, the reinjected carbon dioxide 50' can be provided downstream of the fuel nozzle assembly 98 and the dome structure 144 so that the reinjected carbon dioxide 50' has very little to no effect on the combustion of the fuel and air mixture within a primary combustion zone of combustion chamber 102. Rather, the reinjected carbon dioxide 50' can flow into a downstream portion of the combustion chamber 102 via various openings (not shown) in the combustor liner and/or into the turbine section 20.

Figure 7:
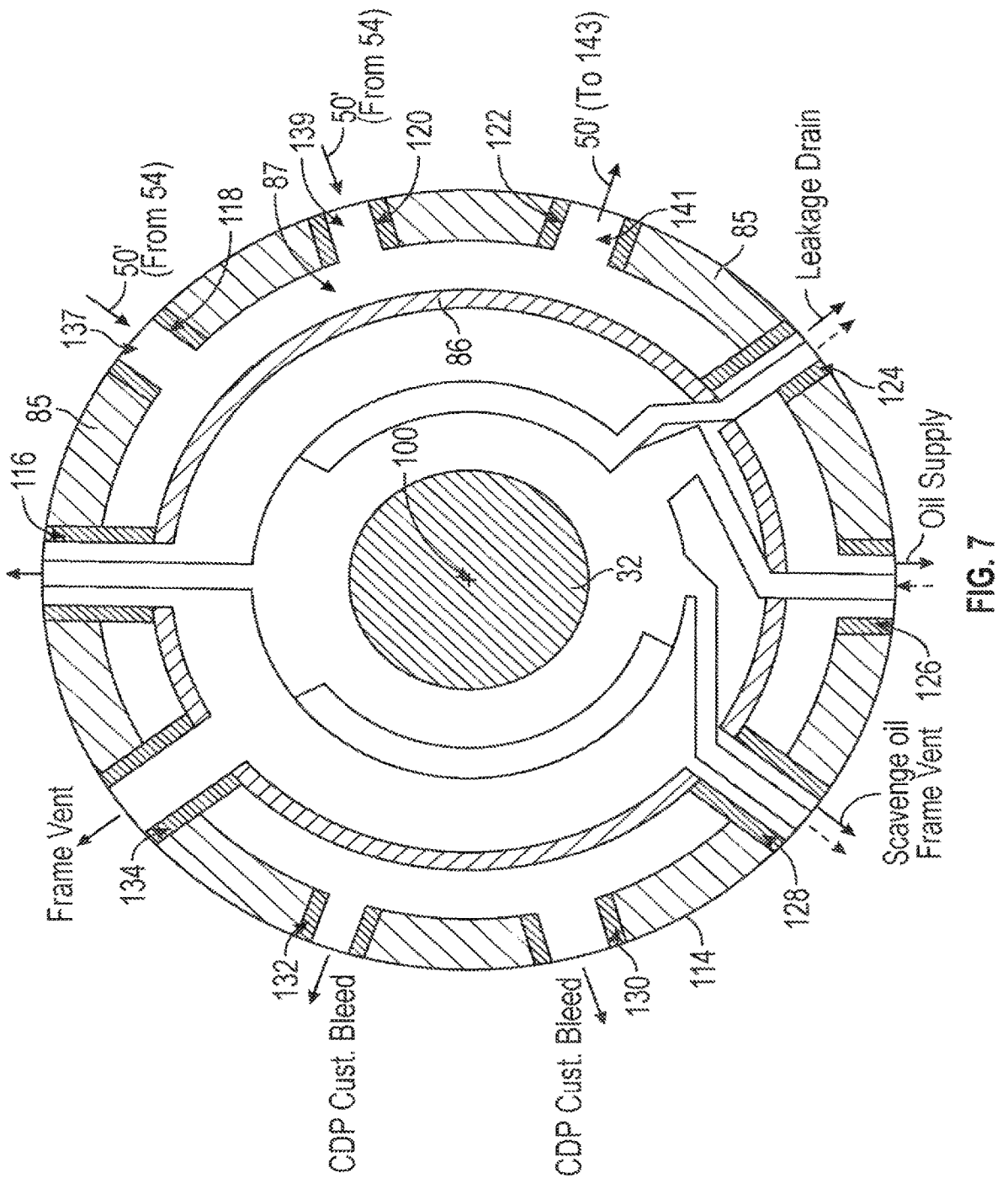
FIG. 7 is a partial cross-sectional view of a compressor discharge pressure (CDP) bleed structure, taken at plane 7-7 of FIG. 4, depicting an arrangement of a compressor rear frame struts and bleed passages therewithin, according to an aspect of the present disclosure.

FIG. 7 is a partial cross-sectional view of the CRF structure 114, taken at plane 7-7 of FIG. 4 (plane 7-7 is also shown partially in FIG. 6), according to an aspect of the present disclosure. In FIG. 7, the CRF structure 114 is seen to include a plurality of CRF struts that are circumferentially spaced apart about the longitudinal centerline axis 100, including a first CRF strut 116, a second CRF strut 118, a third CRF strut 120, a fourth CRF strut 122, a fifth CRF strut 124, a sixth CRF strut 126, a seventh CRF strut 128, an eighth CRF strut 130, a ninth CRF strut 132, and a tenth CRF strut 134. Each of the first CRF strut 116, and the fifth CRF strut 124 through the tenth CRF strut 134, includes a respective bleed passage therewithin that provides a flow of compressed air to bleed out of the CRF structure 114 to various systems within an aircraft (not shown) to which the gas turbine engine 12 is mounted, to another location within the gas turbine engine 12 itself, or simply to vent out of the gas turbine engine 12. On the other hand, the second CRF strut 118 may include a first compressor reverse bleed passage 137 within the second CRF strut 118, a second compressor reverse bleed passage 139 within the third CRF strut 120, and a third compressor reverse bleed passage 141 within the fourth CRF strut 122. The first compressor reverse bleed passage 137 and the second compressor reverse bleed passage 139 are arranged to be in fluid communication with the carbon dioxide reinjection system 54 so as to receive a flow of the carbon dioxide 50' from the carbon dioxide reinjection system 54. The third compressor reverse bleed passage 141 may be in fluid communication with the compressor strut reinjection supply pathway 143 to provide the flow of the reinjected carbon dioxide 50' to the combustor 18. Thus, the carbon dioxide reinjection system 54 can provide a flow of the carbon dioxide 50' as a reverse bleed flow (e.g., a flow into the CRF structure 114 rather than out of the CRF structure 114) to reinject a portion of the carbon dioxide 50 as the carbon dioxide 50' back into the flow path of the gas turbine engine 12. The amount of the carbon dioxide 50' that is reinjected back into the flow path of the gas turbine engine 12 via the first compressor reverse bleed passage 137, via the second compressor reverse bleed passage 139, or the third compressor reverse bleed passage 141 will now be described with regard to FIG. 8.

Figure 8:
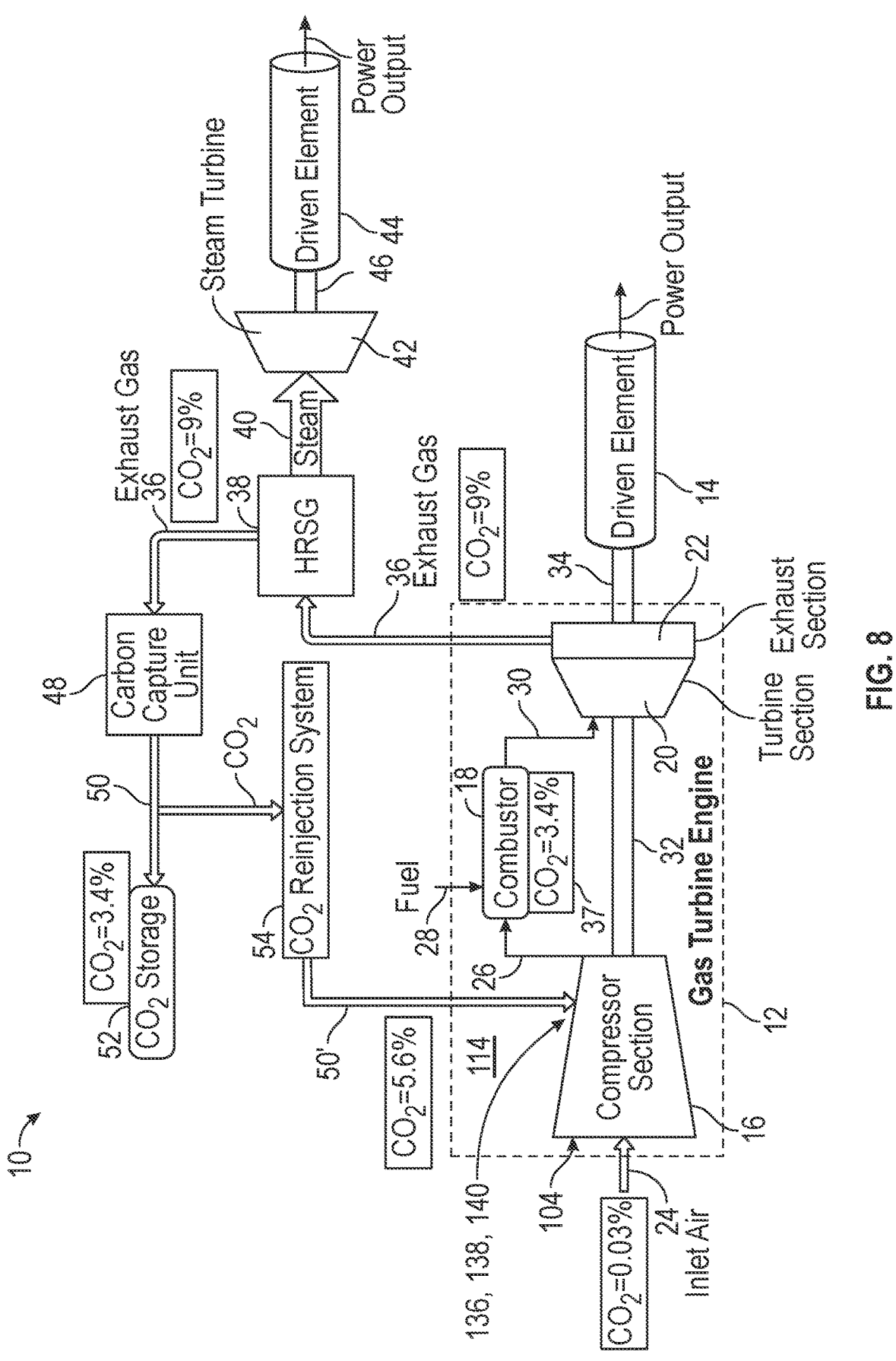
FIG. 8 is a schematic diagram similar to FIG. 1 depicting an exemplary power system and carbon dioxide amounts at various locations within the system, according to another aspect of the present disclosure.

FIG. 8 is a schematic diagram, similar to FIG. 1, depicting an exemplary power system and carbon dioxide amounts at various locations within the system, according to another aspect of the present disclosure. In FIG. 8, carbon dioxide percentages throughout the power system 10 are depicted for the case when the carbon dioxide reinjection system 54 reinjects the carbon dioxide into the gas turbine engine 12 via the CRF structure 114 (e.g., via the first compressor reverse bleed passage 137, the second compressor reverse bleed passage 139, or the third compressor reverse bleed passage 141) as shown in FIG. 6 and FIG. 7. In FIG. 8, elements that are the same as those of FIG. 1 include the same reference numerals and the description of those elements provided above for FIG. 1 applies equally for FIG. 8. As was described above, the inlet air 24 includes a carbon dioxide amount of about 0.03 (0.03%) percent carbon dioxide by volume, and the combustor 18 of the gas turbine engine 12 generates a baseline carbon dioxide amount of about 3.4 percent (3.4%) carbon dioxide by volume in the combustion products 30. FIG. 8 depicts percentages of carbon dioxide at various locations within the power system 10 after reaching the steady-state operating condition for the entire power system 10. That is, as was described above for FIG. 5, during an initial startup phase of the gas turbine engine 12 and the power system 10 in general, the carbon dioxide reinjection system 54 may not reinject carbon dioxide back into the gas turbine engine 12 until the initial startup phase has been completed (e.g., once the gas turbine engine 12 and the other systems within the power system 10 have reached a steady-state operating condition themselves). Thus, during the initial startup phase, the amount of carbon dioxide in the exhaust gas 36 may generally be about 3.4 percent (3.4%) by volume, which is the baseline amount 37 of carbon dioxide generated by the gas turbine engine 12 itself. Once the initial startup phase is completed, the carbon dioxide reinjection system 54 may then begin to reinject the carbon dioxide into the gas turbine engine 12 and the carbon dioxide reinjection system 54 reinjects the carbon dioxide so as to reach a desired steady-state amount of the carbon dioxide within the exhaust gas 36. Alternatively, the carbon dioxide reinjection system 54 may begin reinjecting at least some of the baseline carbon dioxide generated by the gas turbine engine 12 during the initial startup phase back into the gas turbine engine 12 during the initial startup phase, and then continue to reinject the carbon dioxide into the gas turbine engine 12 so as to obtain the desired amount of the carbon dioxide concentration within the exhaust gas 36 to reach the steady state condition.

In the FIG. 8 aspect, the reinjection of the carbon dioxide 50' into the CRF structure 114 (e.g., via the first compressor reverse bleed passage 137, the second compressor reverse bleed passage 139, or the third compressor reverse bleed passage 141) is performed to reinject carbon dioxide into the CRF structure 114 with a concentration of between three percent (3%) and eight percent (8%) by volume, or, as shown in FIG. 8, about 5.6 percent (5.6%) by volume. The reinjection of the carbon dioxide 50' at the CRF structure 114 results in a carbon dioxide concentration within the exhaust gas 36 of between four percent (4%) and fourteen percent (14%) by volume, or, as shown in FIG. 8, in the case when 5.6 percent (5.6%) by volume is reinjected into the CRF structure 114, about nine percent (9%) carbon dioxide concentration by volume, and the carbon capture unit 48 can capture the nine percent (9%) of the carbon dioxide within the exhaust gas 36, compress and store about 3.4 percent (3.4%) by volume of the carbon dioxide 50 within the carbon dioxide storage tank 52, and provide the remaining 5.6 percent (5.6%) by volume of the carbon dioxide 50 to the carbon dioxide reinjection system 54 to be reinjected back into the CRF structure 114. The 5.6 percent (5.6%) by volume of the $CO_2$ provided to the CRF structure 114 is merely one example amount of $CO_2$ for reinjection into the CRF structure 114, and the present disclosure is not limited to the 5.6 percent (5.6%) $CO_2$ reinjection into the CRF structure 114. Some benefits of providing the $CO_2$ reinjection through the reverse compressor bleed passages are: (1) a reduced compressor material durability impact from a higher level of $CO_2$ and the potential for carbonic acid to be introduced into the compressor, (2) less $CO_2$ entering engine lubrication sumps that may go into solution of lubricating oils to reduce the viscosity of the lubricating oils, (3) the compressor itself does not have to provide the energy to compress the $CO_2$ to compressor discharge temperatures, (4) the $CO_2$ impact on the combustion air composition can be reduced if the $CO_2$ is introduced downstream of the combustor dome inlets, and (5) current reverse bleed systems in gas turbine engines that introduce steam into the CRF bleed passages can be utilized for the $CO_2$ reinjection. The ability to segregate the $CO_2$ downstream of the combustor dome may also enable a higher reinjection $CO_2$ concentration to be achieved so as to optimize the overall system cost/weight.

Figure 9:
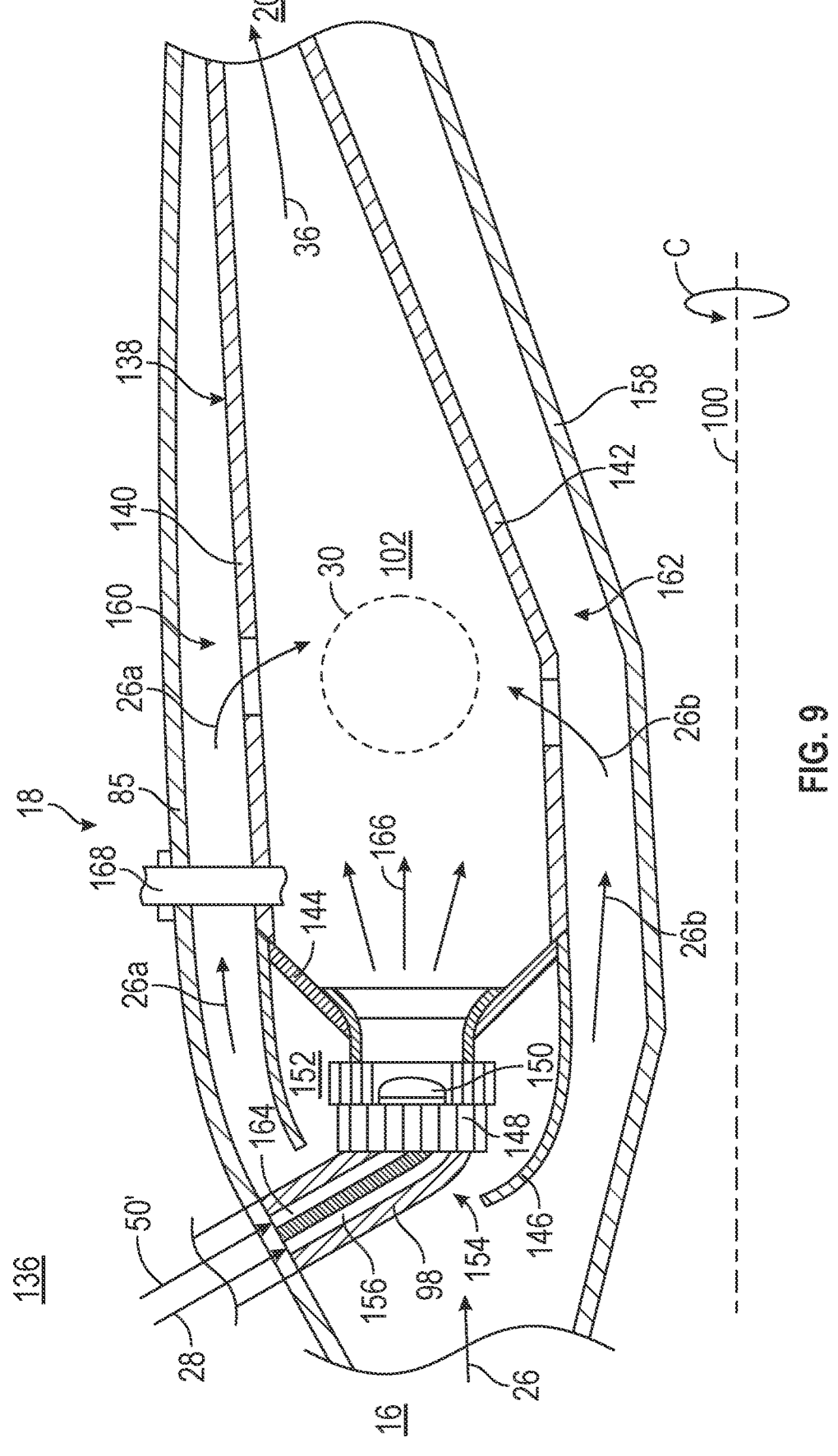
FIG. 9 is an enlarged partial cross-sectional view of a combustor of the gas turbine engine, taken at detail view 136 of FIG. 6, according to an aspect of the present disclosure.

FIG. 9 is an enlarged partial cross-sectional view of the combustor 18 of the gas turbine engine 12, taken at detail view 136 of FIG. 6, according to an aspect of the present disclosure. The combustor 18 includes a combustor liner 138 that includes an outer liner 140 and the inner liner 142, where each of the outer liner 140 and the inner liner 142 extends circumferentially about the longitudinal centerline axis 100. The combustor 18 also includes the dome structure 144 that is connected between the outer liner 140 and the inner liner 142, and that also extends circumferentially about the longitudinal centerline axis 100. The outer liner 140, the inner liner 142, and the dome structure 144 define the combustion chamber 102.

The combustor 18 includes the outer casing 85 that surrounds the outer liner 140, and the inner casing 158 that surrounds the inner liner 142. An outer flow passage 160 is defined between the outer casing 85 and the outer liner 140, and the inner flow passage 162 is defined between the inner casing 158 and the inner liner 142. As the compressed air 26 flows into the combustor 18 from the compressor section 16, a portion of the compressed air 26 (shown schematically as compressed air 26a) flows into the outer flow passage 160. Similarly, another portion of the compressed air 26 (shown schematically as compressed air 26b) flows into the inner flow passage 162. At least a portion of the compressed air 26a flows through openings in the outer liner 140 into the combustion chamber 102, and at least a portion of the compressed air 26b flows through openings in the inner liner 142 into the combustion chamber 102.

As was described above, the combustor 18 includes a plurality of fuel nozzle assemblies 98 (one shown in FIG. 9) that are connected to the dome structure 144 and that are circumferentially spaced apart about the longitudinal centerline axis 100. The combustor 18 shown in FIG. 9 may be referred to as a single annular combustor (SAC), but, as was described above, other types of combustors may be implemented instead, including a dry low emissions (DLE) combustor, a Twin Annular Premixing Swirler (TAPS) combustor, or any other type of combustor. The fuel nozzle assembly 98 depicted in FIG. 9 may include a swirler assembly 148 and a fuel nozzle tip 150 centered inside of the swirler assembly 148. A cowl structure 146 is connected to the outer liner 140, the inner liner 142, and the dome structure 144 so as to define a plenum 152 surrounding the fuel nozzle assembly 98. The cowl structure 146 includes an airflow opening 154 that allows a flow of the compressed air 26 to flow into the plenum 152, where the compressed air 26 can then flow through the swirler assembly 148. The fuel nozzle assembly 98 includes a fuel supply line 156 that provides a flow of the fuel 28 to the fuel nozzle tip 150 that injects the fuel 28 into the swirler assembly 148 so that the fuel 28 mixes with the compressed air 26 passing through the swirler assembly 148 to form a fuel/air mixture within the swirler assembly 148. In the FIG. 9 aspect, the fuel nozzle assembly 98 may also include a carbon dioxide supply line 164 that provides a supply of the carbon dioxide 50' to the fuel nozzle tip 150. The carbon dioxide 50' may be injected from the fuel nozzle tip 150 into the swirler assembly 148 to mix with the fuel 28 injected by the fuel nozzle tip 150 into the swirler assembly 148, and to mix with the compressed air 26 flowing through the swirler assembly 148 so that a fuel/air/carbon dioxide mixture 166 is injected into the combustion chamber 102. The fuel/air/carbon dioxide mixture 166 is then ignited by an ignitor 168 and burned within the combustion chamber 102 to generate the combustion products 30 that then flow into the turbine section 20 as the exhaust gas 36.

While FIG. 9 provides an example of injecting the carbon dioxide 50' into the combustor 18 via injecting the carbon dioxide 50' through the swirler assembly 148 via the fuel nozzle tip 150, other arrangements for injecting the carbon dioxide 50' into the combustor 18 can be implemented instead. For example, rather than the carbon dioxide supply line 164 providing the flow of the carbon dioxide 50' to the swirler assembly 148, the carbon dioxide supply line 164 may be arranged to inject the carbon dioxide 50' into the outer flow passage 160 so that the carbon dioxide 50' mixes with the compressed air 26a in the outer flow passage 160 and then a mixture of the carbon dioxide 50' and the compressed air 26a flows through the openings in the outer liner 140 into the combustion chamber 102. In another example, the carbon dioxide supply line 164 may be arranged in the fuel nozzle assembly 98 to inject the carbon dioxide 50' into the plenum 152 so that the carbon dioxide 50' mixes with the compressed air 26 within the plenum 152 before a carbon dioxide/compressed air mixture flows through the swirler assembly 148 to mix with the fuel 28 injected into the swirler assembly 148 by the fuel nozzle tip 150. In yet another alternative aspect, a carbon dioxide supply line having a nozzle (not shown) may be arranged to extend through the outer casing 85, through the outer flow passage 160, and through the outer liner 140 so as to inject the carbon dioxide 50' directly into the combustion chamber 102. Other arrangements for injecting the carbon dioxide 50' into the combustor 18 may also be implemented.

Figure 10:
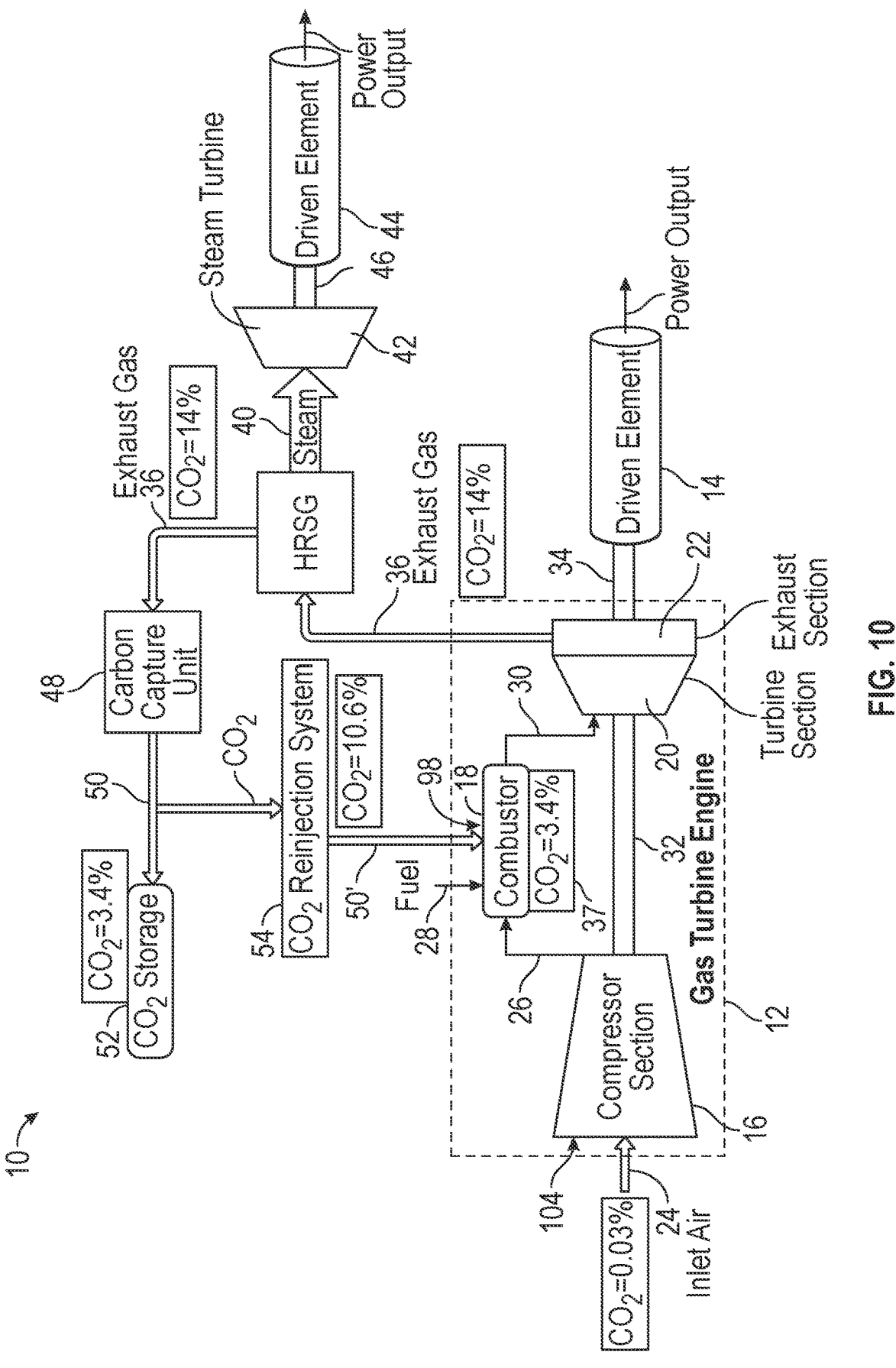
FIG. 10 is a schematic diagram similar to FIG. 1 depicting an exemplary power system and carbon dioxide amounts at various locations within the system, according to yet another aspect of the present disclosure.

FIG. 10 is a schematic diagram, similar to FIG. 1, depicting an exemplary power system and carbon dioxide amounts at various locations within the system, according to yet another aspect of the present disclosure. In FIG. 10, carbon dioxide percentages throughout the power system 10 are depicted for the case when the carbon dioxide reinjection system 54 reinjects the carbon dioxide into the combustor 18 (e.g., via the fuel nozzle assembly 98) as shown in FIG. 9. In FIG. 10, elements that are the same as those of FIG. 1 include the same reference numerals and the description of those elements provided above for FIG. 1 applies equally for FIG. 10. As was described above, the inlet air 24 includes a carbon dioxide amount of about 0.03 percent (0.03%) carbon dioxide by volume, and the combustor 18 of the gas turbine engine 12 generates a baseline carbon dioxide amount of about 3.4 percent (3.4%) carbon dioxide by volume in the combustion products 30. FIG. 8 depicts percentages of carbon dioxide at various locations within the power system 10 after reaching the steady-state operating condition for the entire power system 10. That is, as was described above for FIG. 5 and for FIG. 8, during an initial startup phase of the gas turbine engine 12 and the power system 10 in general, the carbon dioxide reinjection system 54 may not reinject carbon dioxide back into the gas turbine engine 12 until the initial startup phase has been completed (e.g., once the gas turbine engine 12 and the other systems within the power system 10 have reached a steady-state operating condition themselves). Thus, during the initial startup phase, the amount of carbon dioxide in the exhaust gas 36 may generally be about 3.4 percent (3.4%) by volume, which is the baseline amount 37 of carbon dioxide generated by the gas turbine engine 12 itself. Once the initial startup phase is completed, the carbon dioxide reinjection system 54 may then begin to reinject the carbon dioxide into the gas turbine engine 12 and the carbon dioxide reinjection system 54 reinjects the carbon dioxide so as to reach a desired steady-state amount of the carbon dioxide within the exhaust gas 36. Alternatively, the carbon dioxide reinjection system 54 may begin reinjecting at least some of the baseline carbon dioxide generated by the gas turbine engine 12 during the initial startup phase back into the gas turbine engine 12 during the initial startup phase, and then continue to reinject the carbon dioxide into the gas turbine engine 12
so as to obtain the desired amount of the carbon dioxide
concentration within the exhaust gas 36 to reach the steady
state condition.

In the FIG. 10 aspect, the reinjection of the carbon dioxide
50' into the combustor 18 (e.g., via the fuel nozzle assembly
98) is performed to reinject the carbon dioxide 50' into the
combustor 18 with a concentration of between one percent
(1%) and eleven percent (11%) by volume, or, as shown in
FIG. 10, about 10.6 percent (10.6%) by volume carbon
dioxide concentration. The reinjection of the carbon dioxide
50' at the combustor 18 results in a carbon dioxide concen-
tration within the exhaust gas 36 of between four percent
(4%) and fourteen percent (14%) by volume carbon dioxide
concentration, or, as shown in FIG. 10, fourteen percent
(14%) by volume carbon dioxide concentration in the case
when 10.6 percent (10.6%) by volume concentration is
reinjected into the combustor 18. The carbon capture unit 48
can capture the fourteen percent (14%) by volume of the
carbon dioxide within the exhaust gas 36, compress and
store about 3.4 percent (3.4%) by volume of the carbon
dioxide 50 within the carbon dioxide storage tank 52, and
provide the remaining 10.6 percent (10.6%) by volume of
the carbon dioxide 50 to the carbon dioxide reinjection
system 54 to be reinjected back into the combustor 18. The
10.6 percent (10.6%) by volume $CO_2$ reinjection of the $CO_2$
into the combustor 18 is merely one example of the amount
of CO2 that may be reinjected into the combustor 18, and
other percentages may be implemented instead, taking into
account various combustion conditions within the combus-
tor 18 so as to provide combustion flame stability without
starving the combustor 18 of sufficient oxygen needed for
the combustion. Some benefits of the reinjection of the $CO_2$
through the fuel nozzles are: 1) a reduced compressor
material durability impact that would otherwise occur at
higher levels of $CO_2$ and the potential for carbonic acid
affecting the compressor and other engine structures, 2) less
$CO_2$ entering the oil lubrication sumps and to go into
solution to reduce viscosity of the oil, 3) the compressor
does not have to provide the energy to compress the $CO_2$ to
the compressor discharge temperatures, 4) the $CO_2$ can
provide cooling in the fuel nozzle passages to reduce coking
risks, and 5) the impact on the combustion fuel/air/$CO_2$
composition at the flame front can be directly controlled and
tuned to optimize exhaust emissions and burner acoustic
margins. The ability to optimize the $CO_2$ injection pattern
directly at the flame front may enable higher reinjection $CO_2$
concentrations to be achieved to optimize the overall system
cost/weight.

While the foregoing description relates generally to a
power system that includes a gas turbine engine in a land-
based power plant, the power system may also be imple-
mented in other environments. For example, the power
system may be implemented in offshore applications, such
as on an oil production platform in open water (e.g., the
ocean). The provision of the carbon dioxide reinjection
system for reinjecting carbon dioxide back into the gas
turbine engine so as to provide a more efficient carbon
capture unit may be more beneficial for the offshore appli-
cation. The present disclosure may provide for reducing both
the size and the weight of the carbon capture unit, which is
more beneficial for the offshore application where space for
the power system is more limited, and where a reduction in
weight is an important factor.

Further aspects of the present disclosure are provided by
the subject matter of the following clauses.

A power system comprises a gas turbine engine including,
in serial flow relationship defining a flow passage, a com-
pressor section, a combustion section, a turbine section, and
an exhaust section, the combustion section generating a
baseline amount of carbon dioxide by volume within an
exhaust gas output by the gas turbine engine, a carbon
capture unit arranged downstream of the gas turbine engine
and that processes the exhaust gas output by the gas turbine
engine to capture carbon dioxide contained in the output
exhaust gas, including the baseline amount of carbon diox-
ide generated by the combustion section, and a carbon
dioxide reinjection system arranged to reinject at least a
portion of the carbon dioxide captured from the output
exhaust gas by the carbon capture unit into the flow passage
of the gas turbine engine so as to increase an amount of
carbon dioxide within the exhaust gas output by the gas
turbine engine to above the baseline amount of carbon
dioxide.

The power system according to the preceding clause, the
combustion section of the gas turbine engine including one
of a dry low emissions combustor, a single annular com-
bustor, or a twin annular premixing combustor.

The power system according to any preceding clause,
combustion of a fuel and air mixture within the combustion
section of the gas turbine engine generating the baseline
amount of the carbon dioxide by volume in the output
exhaust gas.

The power system according to any preceding clause, the
carbon dioxide reinjection system controlling an amount of
carbon dioxide reinjected into the flow passage to control the
amount of carbon dioxide within the exhaust gas output by
the gas turbine engine.

The power system according to any preceding clause, the
baseline amount of the carbon dioxide by volume in the
output exhaust gas comprising between two percent and five
percent carbon dioxide by volume, and the amount of carbon
dioxide by volume reinjected into the gas turbine engine by
the carbon dioxide reinjection system comprises from two
percent to fifteen carbon dioxide by volume.

The power system according to any preceding clause, the
compressor section including a compressor reverse bleed
passage, and the carbon dioxide reinjection system is
arranged to reinject at least a portion of the carbon dioxide
captured by the carbon capture unit into the compressor
section via the compressor reverse bleed passage.

The power system according to any preceding clause, the
compressor section including a compressor rear frame struc-
ture that includes a plurality of struts, and the compressor
reverse bleed passage is included within at least one of the
plurality of struts.

The power system according to any preceding clause, the
carbon dioxide reinjection system controlling the amount of
carbon dioxide reinjected into the compressor reverse bleed
passage so as to obtain between four percent to fourteen
percent carbon dioxide by volume in the exhaust gas output
by the gas turbine engine.

The power system according to any preceding clause, the
carbon dioxide reinjection system controlling the amount of
reinjected carbon dioxide to inject between three percent to
eight percent carbon dioxide by volume into the compressor
reverse bleed passage.

The power system according to any preceding clause, the
compressor section including a compressor inlet, and the
carbon dioxide reinjection system is arranged to inject the
portion of the carbon dioxide captured by the carbon capture
unit into the compressor inlet.

The power system according to any preceding clause, the compressor inlet including a manifold, and the carbon dioxide is injected into the compressor inlet via the manifold.

The power system according to any preceding clause, the carbon dioxide reinjection system controlling the amount of carbon dioxide reinjected into the compressor inlet so as to obtain between four percent and twelve percent carbon dioxide by volume in the output exhaust gas processed by the carbon capture unit.

The power system according to any preceding clause, the carbon dioxide reinjection system controlling the amount of reinjected carbon dioxide to inject between two percent to eight percent carbon dioxide by volume into the compressor inlet.

The power system according to any preceding clause, the combustion section including a fuel nozzle assembly arranged to inject a fuel-air mixture into a combustion chamber, and the carbon dioxide reinjection system is arranged to inject the portion of the carbon dioxide captured by the carbon capture unit into the combustion chamber via the fuel nozzle assembly so as to mix with the fuel-air mixture.

The power system according to any preceding clause, the carbon dioxide reinjection system controlling the amount of carbon dioxide reinjected into the combustion chamber via the fuel nozzle assembly so as to obtain between four percent to fourteen percent carbon dioxide by volume in the output exhaust gas.

The power system according to any preceding clause, the carbon dioxide reinjection system controlling the amount of reinjected carbon dioxide to reinject between one percent and ten percent carbon dioxide by volume into the combustion chamber via the fuel nozzle assembly.

The power system according to any preceding clause further comprises a heat recovery steam generator arranged downstream of the gas turbine engine, the heat recovery steam generator generating steam utilizing the output exhaust gas from the gas turbine engine, and a steam turbine in fluid communication with the heat recovery steam generator that receives the steam generated by the heat recovery steam generator to cause the steam turbine to rotate.

The power system according to any preceding clause, further comprising a first driven element connected with the gas turbine engine so as to be driven by the gas turbine engine, and a second driven element connected with the steam turbine so as to be driven by the steam turbine.

The power system according to any preceding clause, the first driven element being one of a first electric power generator, a first powertrain system, or a first mechanical drive system, and the second driven element is one of a second power generator, a second powertrain system, or a second mechanical drive system.

A gas turbine engine comprises in serial flow relationship defining a flow path, (a) a compressor section including a compressor inlet and a compressor reverse bleed passage, (b) a combustion section including a combustion chamber and a fuel nozzle assembly arranged to inject a fuel-air mixture into the combustion chamber, (c) a turbine section, and (d) an exhaust section, the gas turbine engine outputting exhaust gas that includes carbon dioxide, the output exhaust gas including a baseline amount of carbon dioxide by volume generated by the combustion section within the output exhaust gas, and a carbon dioxide reinjection system arranged to receive carbon dioxide from a carbon capture unit that captures carbon dioxide from the output exhaust gas, and to reinject the at least a portion of the received carbon dioxide into the flow path of the gas turbine engine, the carbon dioxide reinjection system being arranged to reinject the carbon dioxide into one of the compressor inlet, the compressor reverse bleed passage, or the combustion chamber via the fuel nozzle assembly.

The gas turbine engine according to the preceding clause, the gas turbine engine including one of a dry low emissions combustor, a single annular combustor, or a twin annular premixing combustor.

The gas turbine engine according to any preceding clause, wherein combustion of a fuel and air mixture within the combustion section of the gas turbine engine generates the baseline amount of the carbon dioxide by volume in the output exhaust gas.

The gas turbine engine according to any preceding clause, wherein the carbon dioxide reinjection system controls an amount of carbon dioxide reinjected into the flow passage to control the amount of carbon dioxide within the exhaust gas output by the gas turbine engine.

The gas turbine engine according to any preceding clause, wherein the baseline amount of the carbon dioxide by volume in the output exhaust gas comprises between two percent and five percent carbon dioxide by volume, and the amount of carbon dioxide by volume reinjected into the gas turbine engine by the carbon dioxide reinjection system comprises from two percent to fifteen carbon dioxide by volume.

The gas turbine engine according to any preceding clause, wherein the carbon dioxide reinjection system is arranged to reinject at least a portion of the carbon dioxide captured by the carbon capture unit into the compressor section via the compressor reverse bleed passage.

The gas turbine engine according to any preceding clause, wherein the compressor section including a compressor rear frame structure that includes a plurality of struts, and the compressor reverse bleed passage is included within at least one of the plurality of struts.

The gas turbine engine according to any preceding clause, wherein the carbon dioxide reinjection system controls the amount of carbon dioxide reinjected into the compressor reverse bleed passage so as to obtain between four percent to fourteen percent carbon dioxide by volume in the exhaust gas output by the gas turbine engine.

The gas turbine engine according to any preceding clause, wherein the carbon dioxide reinjection system controls the amount of reinjected carbon dioxide to inject between three percent to eight percent carbon dioxide by volume into the compressor reverse bleed passage.

The gas turbine engine according to any preceding clause, wherein the carbon dioxide reinjection system is arranged to inject the portion of the carbon dioxide captured by the carbon capture unit into the compressor inlet.

The gas turbine engine according to any preceding clause, wherein the compressor inlet includes a manifold, and the carbon dioxide is injected into the compressor inlet via the manifold.

The gas turbine engine according to any preceding clause, wherein the carbon dioxide reinjection system controls the amount of carbon dioxide reinjected into the compressor inlet so as to obtain between four percent and twelve percent carbon dioxide by volume in the output exhaust gas processed by the carbon capture unit.

The gas turbine engine according to any preceding clause, wherein the carbon dioxide reinjection system controls the amount of reinjected carbon dioxide to inject between two percent to eight percent carbon dioxide by volume into the compressor inlet.

The gas turbine engine according to any preceding clause, wherein the carbon dioxide reinjection system is arranged to inject the portion of the carbon dioxide captured by the carbon capture unit into the combustion chamber via the fuel nozzle assembly so as to mix with the fuel-air mixture.

The gas turbine engine according to any preceding clause, wherein the carbon dioxide reinjection system controls the amount of carbon dioxide reinjected into the combustion chamber via the fuel nozzle assembly so as to obtain between four percent to fourteen percent carbon dioxide by volume in the output exhaust gas.

The gas turbine engine according to any preceding clause, wherein the carbon dioxide reinjection system controls the amount of reinjected carbon dioxide to reinject between one percent and ten percent carbon dioxide by volume into the combustion chamber via the fuel nozzle assembly.

The gas turbine engine according to any preceding clause further comprising a heat recovery steam generator arranged downstream of the exhaust section, the heat recovery steam generator generating steam utilizing the output exhaust gas, and a steam turbine in fluid communication with the heat recovery steam generator that receives the steam generated by the heat recovery steam generator to cause the steam turbine to rotate.

The gas turbine engine according to any preceding clause, further comprising a first driven element connected with the gas turbine engine so as to be driven by the gas turbine engine, and a second driven element connected with the steam turbine so as to be driven by the steam turbine.

The gas turbine engine according to any preceding clause, wherein the first driven element being one of a first electric power generator, a first powertrain system, or a first mechanical drive system, and the second driven element is one of a second power generator, a second powertrain system, or a second mechanical drive system.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A power system comprising:
a gas turbine engine including, in serial flow relationship defining a flow passage, a compressor section, a combustion section, a turbine section, and an exhaust section, the combustion section generating a baseline amount of carbon dioxide by volume within an exhaust gas output by the gas turbine engine;
a carbon capture unit arranged downstream of the gas turbine engine to process the exhaust gas output by the gas turbine engine and capture carbon dioxide contained in the exhaust gas, including the baseline amount of carbon dioxide generated by the combustion section; and
a carbon dioxide reinjection system fluidly coupled to the carbon capture unit and arranged to reinject, via at least one carbon dioxide reinjection supply line, at least a portion of the carbon dioxide captured from the exhaust gas by the carbon capture unit into the flow passage of the gas turbine engine so as to increase an amount of carbon dioxide within the exhaust gas output by the gas turbine engine to above the baseline amount of carbon dioxide, wherein the compressor section includes a compressor rear frame structure that includes a plurality of struts, a first compressor reverse bleed passage that is included within at least one of the plurality of struts, and a second compressor reverse bleed passage that is included within at least one of the plurality of struts, and wherein the second compressor reverse bleed passage is in fluid communication with the combustion section, and the carbon dioxide reinjection system is arranged to reinject the carbon dioxide into the compressor section via the first compressor reverse bleed passage and a portion of the reinjected carbon dioxide from the first compressor reverse bleed passage to the combustion section via the second compressor reverse bleed passage.

2. The power system according to claim 1, wherein the combustion section of the gas turbine engine includes a single annular combustor.

3. The power system according to claim 1, wherein combustion of a fuel and air mixture within the combustion section of the gas turbine engine generates the baseline amount of carbon dioxide by volume in the exhaust gas output by the gas turbine engine.

4. The power system according to claim 1, further comprising:
a heat recovery steam generator arranged downstream of the gas turbine engine, the heat recovery steam generator generating steam utilizing the exhaust gas output from the gas turbine engine; and
a steam turbine in fluid communication with the heat recovery steam generator that receives the steam generated by the heat recovery steam generator to cause the steam turbine to rotate.

5. The power system according to claim 4, further comprising:
a first driven element connected with the gas turbine engine so as to be driven by the gas turbine engine; and
a second driven element connected with the steam turbine so as to be driven by the steam turbine.

6. The power system according to claim 5, wherein the first driven element is a first electric power generator and the second driven element is a second mechanical drive system.

7. The power system according to claim 1, wherein the carbon dioxide reinjection system controls an amount of carbon dioxide reinjected into the compressor reverse bleed passage so as to obtain between four percent to fourteen percent carbon dioxide by volume in the exhaust gas output by the gas turbine engine.

8. The power system according to claim 7, wherein the carbon dioxide reinjection system controls the amount of carbon dioxide reinjected into the compressor reverse bleed passage to be between three percent to eight percent carbon dioxide by volume.

9. The power system according to claim 1, wherein the carbon dioxide reinjection system controls an amount of carbon dioxide reinjected into the flow passage to control the amount of carbon dioxide within the exhaust gas output by the gas turbine engine.

10. The power system according to claim 9, wherein the baseline amount of carbon dioxide by volume in the exhaust gas output by the gas turbine engine comprises between two percent and five percent carbon dioxide by volume, and the amount of carbon dioxide by volume reinjected into the gas turbine engine by the carbon dioxide reinjection system comprises from two percent to fifteen percent carbon dioxide by volume.

11. The power system according to claim 9, wherein the compressor section includes a compressor inlet.

12. The power system according to claim 9, wherein the combustion section includes a fuel nozzle assembly arranged to inject a fuel-air mixture into a combustion chamber of the combustion section.

13. The power system according to claim 1, further comprising a compressor strut reinjection supply pathway fluidly connecting the second compressor reverse bleed passage with the combustion section to provide the portion of the reinjected carbon dioxide from the compressor section to the combustion section.

14. A gas turbine engine comprising:

in serial flow relationship defining a flow path, (a) a compressor section including a compressor inlet, a compressor rear frame structure that includes a plurality of struts, a first compressor reverse bleed passage that is included within at least one of the plurality of struts, and a second compressor reverse bleed passage that is included within at least one of the plurality of struts, (b) a combustion section including a combustion chamber and a fuel nozzle assembly arranged to inject a fuel-air mixture into the combustion chamber, (c) a turbine section, and (d) an exhaust section, the gas turbine engine outputting an exhaust gas that includes carbon dioxide, the exhaust gas including a baseline amount of carbon dioxide by volume generated by the combustion section within the exhaust gas; and a carbon dioxide reinjection system arranged to receive carbon dioxide from a carbon capture unit that captures carbon dioxide from the exhaust gas, and to reinject the at least a portion of the received carbon dioxide into the flow path of the gas turbine engine, wherein the carbon dioxide reinjection system is fluidly coupled with the carbon capture unit and is arranged to reinject, via at least one carbon dioxide reinjection supply line, the carbon dioxide into the first compressor reverse bleed passage, wherein the second compressor reverse bleed passage is arranged to receive at least a portion of the reinjected carbon dioxide from the first compressor reverse bleed passage and direct the at least a portion of the reinjected carbon dioxide into the combustion section.

* * * * *